United States Patent [19]

Lugscheider et al.

[11] Patent Number: 4,504,307
[45] Date of Patent: Mar. 12, 1985

[54] METHOD FOR CARRYING OUT MELTING, MELT-METALLURGICAL AND/OR REDUCTION-METALLURGICAL PROCESSES IN A PLASMA MELTING FURNACE AS WELL AS AN ARRANGEMENT FOR CARRYING OUT THE METHOD

[75] Inventors: Walter Lugscheider; Othmar Steipe, both of Linz; Ernst Riegler, Enns; Ernst Zajicek, Ottensheim, all of Austria

[73] Assignee: Voest-Alpine Aktiengesellschaft, Linz, Austria

[21] Appl. No.: 576,030

[22] Filed: Feb. 1, 1984

[30] Foreign Application Priority Data

Feb. 3, 1983 [AT] Austria .................................. 366/83

[51] Int. Cl.$^3$ .......................... C22B 4/00; C21C 5/52
[52] U.S. Cl. ...................................... 75/10 R; 75/12; 75/65 EB
[58] Field of Search .................... 75/10–12, 75/65 EB

[56] References Cited

U.S. PATENT DOCUMENTS 3,347,766 10/1967 Death .................................. 75/10 R Primary Examiner—Peter D. Rosenberg
Attorney, Agent, or Firm—Brumbaugh, Graves, Donohue & Raymond

[57] ABSTRACT

There is disclosed a method for carrying out melting, melt-metallurgical and/or reduction-metallurgical processes in a plasma melting furnace. In its interior, freely burning plasma torches are produced between plasma burners guided through the lid or through the side walls of the furnace body and a bottom electrode. Fluxes and reactive substances to be melted and reacted, respectively, are charged into the region of the plasma torches. In order to increase the energy supply to the charges to be melted or reacted and thus improving the thermal efficiency or kinetics of the process, additional gas flows, which differ from the original plasma gas, are injected into the plasma torches. An arrangement for carrying out the method includes a furnace through whose lid or side walls plasma burners are guided and in whose bottom a counter electrode is arranged. Supply means for introducing additional gas flows into the region of the plasma torches are additionally provided.

12 Claims, 2 Drawing Figures

METHOD FOR CARRYING OUT MELTING, MELT-METALLURGICAL AND/OR REDUCTION-METALLURGICAL PROCESSES IN A PLASMA MELTING FURNACE AS WELL AS AN ARRANGEMENT FOR CARRYING OUT THE METHOD

BACKGROUND OF THE INVENTION

The present invention relates to a method for carrying out melting, melt-metallurgical and/or reduction-metallurgical processes in a plasma melting furnace, in whose interior freely burning plasma torches are produced between plasma burners guided through the lid or through the side walls of the furnace body and a bottom electrode, and fluxes and reactive substances to be melted and reacted, respectively, are charged into the region of the plasma torches, as well as to an arrangement for carrying out the method.

Methods of this kind are known, with argon, nitrogen, helium or hydrogen usually being used as plasma gases. These gases have different electric voltage gradients ($E = U \cdot cm^{-1}$), argon having the lowest and hydrogen having the highest voltage gradient. The lengths of the plasma torches forming depend on the value of the voltage gradient, which means that the plasma torch is longer with a gas having a lower voltage gradient under otherwise equal conditions. Thus, when using argon as the plasma gas and a voltage of about 800 V, the plasma torch has a length of up to about 1 m, whereas, when using hydrogen as the plasma gas at the same voltage and current intensity, the torch has a length of about 10 cm only.

When carrying out melting and reduction processes by using plasma torches as energy carriers, the energy of the plasma torches given off by radiation has not been utilized in a desired manner, because the highest energy density of the plasma torches is developed near the plasma burner mouths. The plasma jet, the farther away from the mouth, is fanned out and thus gets poorer in energy, because the energy given off continuously decreases in dependence on the distance from the mouth. Hence it follows that, particularly, with melting processes in which a sump is formed by melting lumpy charging materials, less and less energy is supplied to the bath in the course of the melting process, while an undesirably large portion of energy is given off to the furnace inner walls. To follow with the plasma burner has little effect, because the arcs thereby become shorter and the energy given off decreases with a decreasing voltage.

The invention aims at avoiding these disadvantages and has as its object to provide a method as well as the pertaining means for increasing the energy supply to the charges to be melted or reacted and thus improving the thermal efficiency and the kinetics of the process. The invention resides on the knowledge that, by the formation of plasma torches containing various gases with different voltage gradients, it is possible to regulate, in particular increase, both the lengths of the torches and the discharge of energy.

SUMMARY OF THE INVENTION

Accordingly, with a method of the initially defined kind, the invention resides in the fact that additional gas flows, which differ from the original plasma gas, are injected into the freely burning plasma torches in order to increase the energy supply into the molten reaction bath and to regulate its temperature.

According to a preferred embodiment, the additional gas flows are supplied through porous bricks or nozzles in the bottom of the plasma furnace, meeting with the impact surfaces (plasma spots) of plasma torches obliquely directed onto the surface of the melt-down stock (sump surface).

It is, however, also possible to inject the additional gas flows into the plasma torches, thus changing their compositions, in another way, for instance, with the help of a bank of tubes arranged concentrically about the plasma burner(s) or through jet pipes guided laterally through the furnace wall.

According to the invention, it is also possible to suspend fine-particle fluxes and reactive substances in the additional gas flows and supply them to the reaction bath. As fine-particle fluxes and reactive substances lime, ores for ferroalloys, coal or iron-oxide-containing materials may be used.

Another embodiment of the invention may consist in that gas-developing substances are added to the charging materials to be melted or reacted, e.g., coal gasifying to CO, the CO formed mixing with the plasma gas. Depending on the site of introduction of the additional gas flows, zones may form which, for instance, are comprised of pure argon at the mouth, of a mixed gas of argon and CO in the center of the plasma torch, and of pure CO on the bath surface. The voltage gradient of CO, as has been found out, is about three to four times that of argon under equal conditions, approximately corresponding to that of helium. On account of these properties, it is possible to shorten a plasma torch having a length of about 1 m at 800 V to about 25 cm at full power and to simultaneously expose to the bath to the maximum radiated energy.

When using coal as flux, not only the energy of the plasma torch is utilized in a better way, but also the coal combustion energy is utilized with the simultaneous presence or introduction of oxygen.

The invention furthermore includes an arrangement for carrying out the method according to the invention, comprising a furnace through whose lid or side walls plasma burners are guided and in whose bottom a counter electrode is arranged. This arrangement is characterized in that supply means for additional gas flows into the region of the plasma torches are provided.

According to a preferred embodiment, porous bricks or nozzles are provided in the bottom of the furnace for supplying the additional gas flows, preferably at those spots which lie vertically below the impact surfaces (plasma spots) of the plasma torches.

Advantageously, a horizontally directed inlet for a gas flow is provided in the region of the sump surface.

Suitably, the plasma burners are displaceable in the axial direction for the purpose of regulating the lengths of the plasma torches.

BRIEF DESCRIPTION OF THE DRAWINGS

A melting plant for carrying out the method according to the invention is illustrated in the drawing, wherein.

DESCRIPTION OF EXEMPLARY EMBODIMENT

Figure 1:
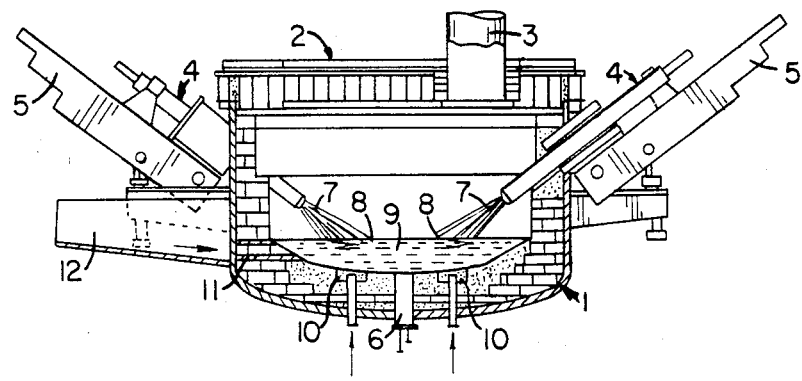
FIG. 1 is a vertical section of the furnace.

In FIG. 1 a refractorily lined furnace body 1 is covered by a refractorily lined lid 2 including a gas discharge duct 3. Laterally through the furnace walls, four plasma burners 4 are guided, which are mounted on a mount 5 so as to be displaceable in the axial direction and are pivotable with the mount. In the bottom of the furnace, a counter electrode 6 is arranged.

The torches produced by the plasma burners are denoted by 7 and their impact surfaces on the bath 9 (plasma spots) after melting of the charging substances are denoted by 8. Vertically therebelow, porous bricks 10 are arranged, through which additional gas flows are introduced during melting of the charging stock. In the region of the sump surface, a horizontally directed inlet 11 for an additional gas flow is furthermore provided. This inlet may also be suited to retain possibly present slag when casting the melted stock through the tap 12, or to facilitate slagging off through the furnace door.

The method according to the invention is going to be explained in more detail by the following examples:

500 kg of ferromanganese fines (76 % manganese, balance: coal, iron) were charged into a melting furnace (capacity 1 m$^3$) comprising a plasma burner guided centrally through the lid. The plasma burner was operated with argon, the gas amount supplied was 1 m$^3$/h. The energy supplied was 300 kW at a voltage of 280 V. The torch length was 32 cm. The total energy spent amounted to 750 kWh/t.

The charge was repeated by using charging stock of the same composition, yet with coal dust suspended in the air having been blown into the furnace through a steel lance; thereby, the length of the torch was reduced to 20 cm, the overall voltage rising to 320 V. The CO-content, at the end of the melting process, was higher than 60% in the furnace space. The required melting energy thereby was reduced to 600 kWh/t, which means that the energy input into the melting stock was considerably improved and the transmission of the heat to the furnace walls was accordingly reduced.

Figure 2:
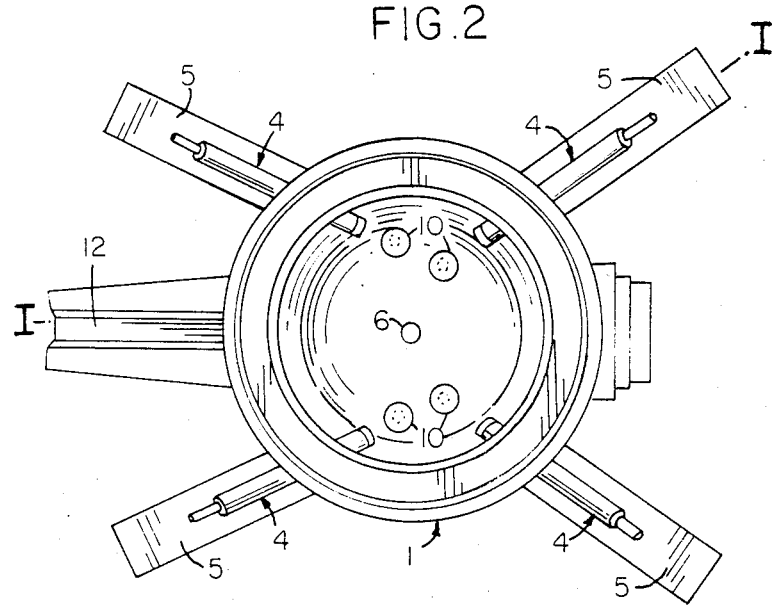
FIG. 2 is a top view of the furnace with the lid removed.

By using an arrangement according to FIGS. 1 and 2, steel scrap having a density of 1.7 t/m$^3$ was melted, i.e., 30 t of this scrap had been charged into the furnace. The four plasma burners were operated with argon at the beginning of melting, 14 MW having been used at an arc voltage of 600 V. At the beginning and during the first phase of melting, the length of the torches was 1 m, the tip of the torches reaching into the scrap. After the formation of a sump and, accordingly, a reduction of the surface, CO was supplied through the porous bottom bricks and the plasma torches were displaced in the axial direction towards the sump, the torch length decreasing to 30 cm at an equal output. An energy input of 420 kWh/t was attained, whereas, without supply of CO, the total energy spent (melt-down energy consumption) would have amounted to 470 kWh/t.

200 kg of LD-dust of the following composition: Fe$_{total}$=40.8%; Fe$_{metallic}$=0.8%; FeO=3.90%; Fe$_2$O$_3$=52.9%; Zn=1.35%; were charged into a reduction furnace having a content of 250 l, with a central plasma burner guided through the furnace lid, which was operated with argon and had a voltage of 250 V and an output of 200 kWh, the dust being continuously supplied through a conveyor worm and introduced into the region of radiation of the plasma torch in a falling manner. The amount supplied was 30 kg/h. At the same time, breeze was supplied to the region of the plasma torch also continuously in a falling manner at an amount of 15 kg/h. Thereby, a plasma gas formed, consisting of argon at the mouth of the burner, yet of CO at the impact site of the sump formed. After a reaction period of 6.5 h a melted reaction product of the following composition had formed: Fe$_{total}$=88.5%; Fe$_{metallic}$=82.2%; FeO=1.0%; Fe$_2$O$_3$=7.85%; Zn=0.04%. The degree of metallization of the process thus is 93%.

The total energy usually required for such processes, which amounts to about 3,000 kWh/t, according to the invention was reduced to about 2,500 kWh/t.

In this example, the formation of the various zones is achieved by supplying less argon than usually.

In this example, a de-zincification of the LD-dust is achieved, in addition.

What we claim is:

1. In a method for carrying out metallurgical processes in a plasma melting furnace having a furnace body formed by a bottom including a bottom electrode, a lid and side walls so as to define an inner space, and plasma burners guided through one of said lid and said side walls, by producing freely burning plasma torches of an original plasma gas between the mouths of said plasma burners and said bottom electrode and by charging at least one of fluxes to be melted and reactive substances to be reacted into the region of said plasma torches, the improvement which comprises injecting additional gas flows differing from said original plasma gas into said freely burning plasma torches at locations spaced at a distance from the mouths of said plasma burners so as to increase the energy input into a molten reaction bath formed and to regulate its temperature.

2. A method as set forth in claim 1, wherein said additional gas flows are injected through porous bricks provided in said bottom of said plasma furnace, and said plasma torches are obliquely directed onto the surface of melting stock (sump surface) so as to form impact surfaces (plasma spots) thereon, said additional gas flows meeting with said impact surfaces.

3. A method as set forth in claim 1, wherein said additional gas flows are injected through nozzles provided in said bottom of said plasma furnace, and said plasma torches are obliquely directed onto the surface of melting stock (sump surface) so as to form impact surfaces (plasma spots) thereon, said additional gas flows meeting with said impact surfaces.

4. A method as set forth in claim 1, further comprising suspending at least one of fine-particle fluxes and reactive substances in said additional gas flows and supplying them to the reaction bath.

5. A method as set forth in claim 4, wherein said fine-particle fluxes and reactive substances are selected from the group consisting of lime, ores for ferroalloys, coal and iron oxide-containing materials.

6. In an arrangement for carrying out metallurgical processes, of the type including a plasma melting furnace formed by side walls, a furnace bottom and a furnace lid, a counter electrode being arranged in said furnace bottom and plasma burners being guided through one of said furnace lid and said side walls, wherein freely burning plasma torches of an original plasma gas are produced between the mouths of said plasma burners and said counter electrode, and at least one of fluxes to be melted and reactive substances to be reacted are charged into the region of said plasma torches, forming a melting stock, the improvement which comprises supply means spaced from said plasma burners for supplying additional gas flows into said plasma torches at a distance from the mouths of said plasma burners.

7. An arrangement as set forth in claim 6, wherein said supply means for said additional gas flows comprise porous bricks provided in said furnace bottom.

8. An arrangement as set forth in claim 7, wherein said porous bricks are provided on sites located vertically below the impact surfaces (plasma spots) of said plasma torches on said melting stock.

9. An arrangement as set forth in claim 6, wherein said supply means for said additional gas flows comprise nozzles provided in said furnace bottom.

10. An arrangement as set forth in claim 9, wherein said nozzles are provided on sites located vertically below the impact surfaces (plasma spots) of said plasma torches on the melting stock.

11. An arrangement as set forth in claim 6, wherein a sump is formed and which further includes a horizontally directed inlet provided in the region of the surface of said sump for a gas flow.

12. An arrangement as set forth in claim 6, wherein said plasma burners are displaceable in the axial direction for regulating the length of said plasma torches.

* * * * *